United States Patent
Fujikawa et al.

(10) Patent No.: US 8,455,132 B2
(45) Date of Patent: Jun. 4, 2013

(54) LITHIUM ION SECONDARY BATTERY AND CHARGE SYSTEM THEREFOR

(75) Inventors: Masato Fujikawa, Osaka (JP); Shinji Kasamatsu, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 803 days.

(21) Appl. No.: 11/698,206

(22) Filed: Jan. 26, 2007

(65) Prior Publication Data

US 2007/0178376 A1     Aug. 2, 2007

(30) Foreign Application Priority Data

Jan. 27, 2006  (JP) ................................ 2006-018733

(51) Int. Cl.
    *H01M 2/16*      (2006.01)
(52) U.S. Cl.
    USPC ........... 429/144; 429/129; 429/188; 429/324; 429/247; 429/249
(58) Field of Classification Search
    USPC .................. 429/144; 423/129, 188, 324, 247, 423/249
    See application file for complete search history.

(56) References Cited

U.S. PATENT DOCUMENTS

| | | | |
|---|---|---|---|
| 5,658,689 A * | 8/1997 | Kawakami et al. | 429/307 |
| 6,432,576 B1 * | 8/2002 | Hikmet | 429/162 |
| 6,818,352 B2 * | 11/2004 | Daido et al. | 429/231.95 |
| 6,881,438 B2 | 4/2005 | Daido et al. | |
| 6,937,459 B2 * | 8/2005 | Yamazaki et al. | 361/502 |
| 7,094,497 B2 * | 8/2006 | Daido et al. | 429/142 |
| 7,749,641 B2 * | 7/2010 | Ren et al. | 429/50 |
| 2001/0008733 A1 | 7/2001 | Tanaka et al. | |
| 2002/0055036 A1 | 5/2002 | Shinohara et al. | |
| 2002/0197413 A1 | 12/2002 | Daido et al. | |
| 2003/0003363 A1 | 1/2003 | Daido et al. | |
| 2003/0017386 A1 | 1/2003 | Daido et al. | |
| 2004/0038130 A1 * | 2/2004 | Imachi et al. | 429/250 |
| 2004/0166415 A1 * | 8/2004 | Zhang et al. | 429/249 |
| 2004/0234865 A1 | 11/2004 | Sato et al. | |
| 2005/0079406 A1 | 4/2005 | Daido et al. | |
| 2005/0142446 A1 * | 6/2005 | Yamamoto et al. | 429/231.95 |
| 2005/0214637 A1 * | 9/2005 | Imachi et al. | 429/144 |

(Continued)

FOREIGN PATENT DOCUMENTS

| | | |
|---|---|---|
| CN | 1372706 A | 10/2002 |
| CN | 1523686 A | 8/2004 |

(Continued)

OTHER PUBLICATIONS

Korean Office Action issued in Korean Patent Application No. KR 10-2007-0008433, dated Mar. 24, 2008.

(Continued)

*Primary Examiner* — Melvin C Mayes
*Assistant Examiner* — Melissa Stalder
(74) *Attorney, Agent, or Firm* — McDermott Will & Emery LLP (57) ABSTRACT

A lithium ion secondary battery includes a positive electrode, a negative electrode, a non-aqueous electrolyte, and a separator interposed between the positive electrode and the negative electrode. The separator includes a polyolefin layer and an oxidation-resistant layer. The oxidation-resistant layer includes an oxidation-resistant polymer. A main chain of the oxidation-resistant polymer does not include a —$CH_2$— group and a —$CH(CH_3)$— group. The oxidation-resistant layer faces the positive electrode.

13 Claims, 1 Drawing Sheet

U.S. PATENT DOCUMENTS

| | | |
|---|---|---|
| 2005/0244715 A1 | 11/2005 | Cho et al. |
| 2007/0072068 A1 | 3/2007 | Zhang et al. |
| 2008/0248392 A1 | 10/2008 | Takeuchi et al. |

FOREIGN PATENT DOCUMENTS

| | | | |
|---|---|---|---|
| JP | 11144697 A | * | 5/1999 |
| JP | 2000-100408 A | | 4/2000 |
| JP | 2000138048 A | * | 5/2000 |
| JP | 2002-151044 A | | 5/2002 |
| JP | 2005-317551 A | | 11/2005 |
| KR | 1998-081465 | | 11/1998 |
| KR | 10-2004-0037154 | | 5/2004 |
| WO | WO 2005/048380 A1 | | 5/2005 |

OTHER PUBLICATIONS

Chinese Office Action, w/ English translation thereof, issued in Chinese Patent Application No. CN 2007100081969 dated on Oct. 24, 2008.

Japanese Office Action issued in Japanese Patent Application No. 2007-008947, dated Jan. 26, 2012.

* cited by examiner

LITHIUM ION SECONDARY BATTERY AND CHARGE SYSTEM THEREFOR

FIELD OF THE INVENTION

The present invention relates to a structure and an arrangement of a separator included in lithium ion secondary batteries, especially to a lithium ion secondary battery which is charged to a voltage as high as 4.3 V or more.

BACKGROUND OF THE INVENTION

Lithium ion secondary batteries have been gaining attention as a high capacity power source mainly for portable devices. Developments are still conducted currently, aiming for further high capacity lithium ion secondary batteries. Generally, lithium ion secondary batteries include a positive electrode using lithium cobalt oxide ($LiCoO_2$) as the active material, and a negative electrode using various graphites as the active material. Between the positive electrode and the negative electrode, a separator (microporous resin film) which electronically insulates both electrodes and keeps electrolyte is disposed. For the resin film material, polyolefin is generally used.

The cut-off-voltage of charge of batteries including a positive electrode containing lithium cobalt oxide as the active material and a negative electrode containing graphite as the active material is generally set to 4.1 to 4.2 V. In such a case, all the lithium included in the positive electrode is not necessarily used for the battery reaction. Therefore, by setting the cut-off-voltage of charge further higher to increase the utilization rate of the lithium in lithium cobalt oxide, the energy density of lithium ion secondary batteries can be increased.

On the other hand, when the separator contacting the positive electrode surface comprises polyethylene, in a charged battery, deterioration of the separator due to oxidization occurs especially at high temperatures, which is known to cause battery deterioration.

Thus, to prevent the deterioration of the separator in a charged battery due to oxidation, there has been proposed that a layer comprising polypropylene, which is more resistant to oxidization than polyethylene, is provided at the side of the separator contacting the positive electrode (Japanese Laid-Open Patent Publication No. 2000-100408). For example, a separator in which a layer comprising polyethylene and a layer comprising polypropylene are stacked is proposed.

However, even with polypropylene which is more resistant to oxidization than polyethylene, when the cut-off-voltage of charge of the lithium ion secondary battery is set to 4.3 V or more, oxidization advances to deteriorate the battery.

BRIEF SUMMARY OF THE INVENTION

The present invention aims to provide a high-performance lithium ion secondary battery, in which deterioration due to oxidization of the separator is less likely to occur even though the cut-off-voltage of charge is set high.

The present invention relates to a lithium ion secondary battery comprising: a positive electrode; a negative electrode; a non-aqueous electrolyte; and a separator interposed between the positive electrode and the negative electrode; wherein the separator comprises a polyolefin layer and an oxidation-resistant layer; the oxidation-resistant layer comprises an oxidation-resistant polymer; the main chain of the oxidation-resistant layer does not include a —$CH_2$— group (methylene group) and does not include a —$CH(CH_3)$— group (methylmethylene group); and the oxidation-resistant layer faces the positive electrode.

The cut-off-voltage of charge of the lithium ion secondary battery of the present invention is preferably set to 4.3 V or more. The oxidation-resistant polymer preferably comprises at least one selected from the group consisting of polyimide, aramid, and polyamideimide. The polyolefin layer preferably comprises polyethylene.

In the IR spectrum of the oxidation-resistant polymer, when the heights of the absorption peaks at around 2900 $cm^{-1}$ and at around 1150 $cm^{-1}$ are respectively 0 to 7% of the maximum value of the heights of the absorption peaks in the range of 500 to 3500 $cm^{-1}$, oxidation of the separator can be practically avoided.

The absorption peak at around 2900 $cm^{-1}$ is attributable to C—H stretching vibration of the —$CH_2$— group, and the absorption peak at around 1150 $cm^{-1}$ is attributable to C—C stretching vibration of the —$CH(CH_3)$— group.

That is, even when a small amount of the —$CH_2$— group and/or the —$CH(CH_3)$— group is included in the oxidation-resistant layer, it can be regarded that the oxidation-resistant layer does not substantially include the —$CH_2$— group and the —$CH(CH_3)$— group.

In view of the above, the present invention further relates to a lithium ion secondary battery comprising: a positive electrode; a negative electrode; a non-aqueous electrolyte; and a separator interposed between the positive electrode and the negative electrode; wherein the separator comprises a polyolefin layer and an oxidation-resistant layer; the oxidation-resistant layer comprises an oxidation-resistant polymer; in an IR spectrum for the oxidation-resistant polymer, each height of absorption peaks attributable to C—H stretching vibration of the —$CH_2$— group and attributable to C—C stretching vibration of the —$CH(CH_3)$— group is 0 to 7% of the maximum value of heights of absorption peaks in a range of 500 to 3500 $cm^{-1}$; and the oxidation-resistant layer faces the positive electrode.

In the absorption peaks attributable to the oxidation-resistant polymer, as a typical example of the peak whose height becomes the highest in the range of 500 to 3500 $cm^{-1}$, for example, the following may be mentioned: an absorption peak at around 680 $cm^{-1}$ to around 900 $cm^{-1}$ which is attributable to CH out-of-plane vibration of an aromatic ring; an absorption peak at around 1630 $cm^{-1}$ to around 1750 $cm^{-1}$ which is attributable to C=O stretching vibration of amide group; an absorption peak at around 1510 $cm^{-1}$ to around 1630 $cm^{-1}$ which is attributable to N—H deformation vibration and C—N stretching vibration; an absorption peak at around 1720 $cm^{-1}$ to around 1780 $cm^{-1}$ which is attributable to C=O stretching vibration of imides; and an absorption peak at around 1250 $cm^{-1}$ which is attributable to C—O stretching vibration of aromatic ether group. In the range of 500 to 3500 $cm^{-1}$, an absorption peak of any of these shows the maximum value.

The height of the absorption peak is obtained by subtracting the background.

The present invention also relates to a charge system for a lithium ion secondary battery including: the lithium ion secondary battery mentioned above and its charger, wherein the cut-off-voltage of charge is set to 4.3 V or more.

The present invention also relates to a charge and discharge system including: the charge system noted in the above and a load device that consumes electric power of the lithium ion secondary battery (for example, portable electronic devices).

Since the hydrogen atom of the —CHR— group (R=H or $CH_3$) is easily released, it is easily oxidized when exposed to the potential of the positive electrode. Therefore, by allowing the oxidation-resistant layer comprising the oxidation-resistant polymer substantially not including the —CHR— group to face the positive electrode, deterioration by oxidation of the separator can be retarded. Due to the presence of the polyolefin layer, high flexibility can be secured in the separator.

The lithium ion secondary battery of the present invention is unlikely to deteriorate even in the case when charged to a high voltage. Thus, by setting the cut-off-voltage of charge higher, a lithium ion secondary battery with a high energy density and a long life can be provided.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A lithium ion secondary battery of the present invention includes a positive electrode, a negative electrode, a non-aqueous electrolyte, and a separator interposed between the positive electrode and the negative electrode. The separator includes a polyolefin layer and an oxidation-resistant layer.

The oxidation-resistant layer includes an oxidation-resistant polymer substantially not including the —$CH_2$— group and not including the —$CH(CH_3)$— group. The oxidation-resistant layer is disposed to face the positive electrode.

The oxidation-resistant polymer preferably has a heat distortion temperature of 260° C. or more, though the heat distortion temperature is not limited. That is, the deflection temperature under load of the oxidation-resistant polymer with a load of 1.82 MPa determined by a test method according to ASTM-D648 of American Society for Testing and Materials is preferably 260° C. or more.

Specific examples of the oxidation-resistant polymer include, for example, aramid (aromatic polyamide), polyamideimide, polyimide, polyphenylene sulfide (PPS), polyetherimide, polyarylate, polyetheretherketone, and polybenzoimidazole. These may be used singly, or may be used in combination.

The thickness of the oxidation-resistant layer is preferably 1 to 16 μm, and particularly preferably 2 to 10 μm, though the thickness is not limited. It is difficult to form an oxidation-resistant layer with a thickness of below 1 μm without a defect. Thus, in view of preventing oxidization of the polyolefin layer, the thickness of the oxidation-resistant layer is preferably 1 μm or more. When the thickness of the oxidation-resistant layer exceeds 16 μm, the impedance of the battery increases, and charge and discharge performance declines though slightly.

The porosity of the oxidation-resistant layer is preferably in the range that enables sufficient migration of lithium ions. In view of this, the porosity is preferably 20 to 70%. The porosity can be determined by calculation, based on the weight, the thickness, and the true specific gravity of the oxidation-resistant layer having a certain size.

The oxidation-resistant layer may include an inorganic filler. The addition of an inorganic filler increases the heat-resistance of the oxidation-resistant layer. The inorganic filler content is preferably below 80 wt. %, and particularly preferably 25 to 75 wt. % relative to the weight of the oxidation-resistant layer, in view of optimizing the porous structure of the oxidation-resistant layer.

Specific examples of the inorganic filler include, for example, alumina, magnesia, silica, zirconia, titania, yttria, zeolite, silicon nitride, and silicon carbide. These may be used singly, or may be used in combination.

For the polyolefin layer to be stacked with the oxidation-resistant layer, a microporous film comprising polyethylene or polypropylene is preferably used, in view of flexibility. For example, a microporous film comprising polyolefin, which is conventionally used as a separator, may be used as the polyolefin layer. Particularly, a microporous film comprising polyethylene is preferable, in view of its shutdown function.

The shutdown function refers to the function of a resin of melting or deforming at high temperatures to close the pores in the film. Based on the shutdown function, at abnormally high temperatures, the ion permeability of the separator suddenly drops to shutdown the electric current.

The oxidation-resistant layer does not exhibit the shutdown function even at high temperatures. By stacking such an oxidation-resistant layer and a microporous film comprising polyethylene with a low melting point, battery safety at high temperatures improves effectively.

The thickness of the separator (that is, the total thickness of the oxidation-resistant layer and the polyolefin layer) is not particularly limited, but considering battery performance, safety, and designed capacity totally, 10 to 25 μm is preferable.

The oxidation-resistant layer is formed, for example, by forming a film of an oxidation-resistant polymer at the surface of the microporous film comprising polyolefin. The oxidation-resistant layer can be formed as well by forming a film of an oxidation-resistant polymer on a substrate other than the microporous film, peeling off the film from the substrate, and integrating the film with a microporous film comprising polyolefin. However, the method of forming the oxidation-resistant layer is not limited to the above.

A method of forming a film of an oxidation-resistant polymer is exemplified in the following.

In the case when an aramid resin is used as the oxidation-resistant polymer, a solution is prepared by dissolving an aramid resin in a polar solvent. For the polar solvent, for example, N-methyl-2-pyrrolidone (NMP) is used. A film can be formed by applying the obtained aramid solution on a microporous film comprising polyolefin or on a substrate, and volatilizing the polar solvent. In the aramid solution, an inorganic filler may be added to form a highly heat-resistant film.

When a polyimide resin is used as the oxidation-resistant polymer, for example, a solution of polyamide acid dissolved in NMP is prepared. Polyamide acid is, for example, a condensation product of pyromellitic acid anhydride and diaminodiphenylether, and changes into polyimide by heating. A film can be made by applying the polyamide acid solution on a substrate and volatilizing the NMP. The obtained film is drawn to obtain a microporous film. The obtained microporous film and a polyolefin-made microporous film are integrated with heat rollers, to obtain a separator with the oxidation-resistant layer. The porosity of the oxidation-resistant layer can be controlled by changing the conditions of the drawing-process.

Positive electrodes usually include an active material and a sheet-form current collector (core member) carrying the active material. For the positive electrode current collector, an aluminum foil is preferably used, and its thickness is for example 10 to 30 μm. For the positive electrode active material, various materials conventionally used as the positive electrode active material of lithium ion secondary batteries may be used. The positive electrode preferably includes a material mixture carried on the current collector, the material mixture including a positive electrode active material and a small amount of an optional component. For the optional component, a binder or a conductive material may be mentioned.

Specific examples of the positive electrode active material include, lithium-containing transition metal oxides such as lithium cobalt oxide, lithium nickel oxide, and lithium manganese oxide. A portion of the transition metal in the lithium-containing transition metal oxide may be replaced with other elements. For example, a lithium cobalt oxide modified by replacing a portion of cobalt with aluminum or magnesium, and a lithium nickel oxide modified by replacing a portion of nickel with cobalt or manganese may be used. One kind of the positive electrode active material may be used singly, or different kinds of the positive electrode active materials may be used in combination. When a battery with a cut-off-voltage of charge of 4.3 V or more is to be obtained, particularly, a positive electrode active material having the composition represented by the following general formula is preferably used: $Li_aNi_{1-(b+c)}Mn_bCo_cO_2$, where $1 \leq a \leq 1.05$, $0.1 \leq b \leq 0.5$, $0.1 \leq c \leq 0.8$, $0.2 \leq b+c \leq 0.8$.

For the binder to be included in the positive electrode material mixture, polytetrafluoroethylene (PTFE), modified polyacrylic acid rubber particles (BM-500B (product name) manufactured by Zeon Corporation), and polyvinylidene fluoride (PVDF) may be mentioned. PTFE and rubber particles are preferably used in combination with carboxymethyl cellulose (CMC), polyethylene oxide, and modified soluble acrylonitrile rubber (BM-720H (product name) manufactured by Zeon Corporation) that give thickening effects. One of these may be used singly, or two or more of these may be used in combination.

Negative electrodes usually include an active material and a sheet-form current collector (core member) carrying the active material. For the negative electrode current collector, a copper foil is used preferably, and its thickness is for example 5 to 50 μm. For the negative electrode active material, various materials conventionally used as the negative electrode active material of lithium ion secondary batteries may be used. The negative electrode preferably includes a material mixture carried on the current collector, the material mixture including the negative electrode active material and a small amount of an optional component. For the optional component, a binder or a conductive material may be mentioned.

Specific examples of the negative electrode active material include carbon materials (for example, various natural graphites and artificial graphites), a material including Si such as simple substance of Si, a Si alloy, and $SiO_x$ ($0<x<2$), a material including Sn such as simple substance of Sn, a Sn alloy, and SnO, and lithium metal. The lithium metal includes, other than the simple substance of lithium, a lithium alloy including Al, Zn or Mg. One kind of the negative electrode active material may be used singly, or two or more kinds of the negative electrode active materials may be used in combination.

For the binder to be included in the negative electrode material mixture, any of the binders that may be included in the positive electrode material mixture may be used. However, in view of improving safety of the battery under overcharged state, rubber particles such as styrene butadiene copolymer (SBR) are preferably used with CMC having thickening effects.

For the conductive material to be included in the positive electrode material mixture and the negative electrode material mixture, acetylene black, Ketjen black, carbon fiber, and various graphites may be mentioned. One of these may be used singly, or two or more of these may be used in combination.

For the non-aqueous electrolyte, a non-aqueous solvent in which a lithium salt is dissolved is preferably used.

For the lithium salt, lithium hexafluorophosphate ($LiPF_6$), lithium perchlorate ($LiClO_4$), lithium tetrafluoroborate ($LiBF_4$), $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, lithium tetrachloroborate, lithium tetraphenylborate, and lithium imide salt may be used. These may be used singly, or may be used in combination. The amount of the lithium salt to be dissolved in the non-aqueous solvent is not particularly limited. However, the lithium salt concentration is preferably 0.2 to 2 mol/L, and further preferably 0.5 to 1.5 mol/L.

For the non-aqueous solvent, the following may be used: cyclic carbonates such as ethylene carbonate (EC), propylene carbonate (PC), and butylene carbonate (BC); linear carbonates such as dimethylcarbonate (DMC), diethylcarbonate (DEC), ethylmethylcarbonate (EMC), and dipropyl carbonate (DPC); aliphatic carboxylic acid esters such as methyl formate, methyl acetate, methyl propionate, ethyl propionate; lactones such as γ-butyrolactone and γ-valerolactone; linear ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethyl sulfoxide; 1,3-dioxolane; formamide; acetamide; dimethyl formamide; dioxolane; acetonitrile; propionitrile; nitromethane; ethyl monoglyme; phosphoric acid triester; trimethoxymethane; dioxolane derivative; sulfolane; methyl sulfolane; 1,3-dimethyl-2-imidazolidinone; 3-methyl-2-oxazolidinone; propylene carbonate derivative; tetrahydrofuran derivative; ethyl ether; 1,3-propanesultone; anisole; dimethyl sulfoxide; and N-methyl-2-pyrrolidone. These may be used singly, but preferably, two or more of these are used in combination. Among these, a solvent mixture of a cyclic carbonate and a linear carbonate, or a solvent mixture of a cyclic carbonate, a linear carbonate, and a carboxylic acid ester is preferable.

To the non-aqueous electrolyte, various additives may be added, to improve charge and discharge performance of the battery. For the additives, for example, vinylene carbonate (VC), vinyl ethylene carbonate (VEC), cyclohexylbenzene (CHB), and fluorobenzene are preferably used. These additives achieve formation of an excellent film on the positive electrode and/or the negative electrode, and improve stability of the battery in overcharged state.

The capacity of lithium ion secondary batteries is designed based on the cut-off-voltage of charge of batteries. Thus, when the cut-off-voltage of charge of lithium ion secondary batteries is changed arbitrarily, desired battery performance cannot be obtained, and battery life is shortened. Therefore, the cut-off-voltage of charge is actually regarded as an element that determines battery performance. In a charge system including a lithium ion secondary battery and its charger, charging is stopped when the battery voltage is a predetermined cut-off-voltage of charge. However, usually, a battery is charged with a constant current till reaching the predetermined cut-off-voltage of charge, and then charged with a constant voltage at the cut-off-voltage of charge.

The theoretical capacity of the positive electrode is determined as in below.

A cell is assembled by using a portion of the prepared positive electrode (positive electrode piece). The weight of the active material included in the positive electrode piece can be obtained by calculation. After obtaining the positive electrode active material weight, the positive electrode piece and an excessive amount of Li foil relative to the theoretical capacity of the positive electrode piece are made to face each other, and are immersed in a plentiful electrolyte, to obtain a cell. The cell is charged and discharged in a range of voltage higher by 0.1 V than the range of battery usage voltage that is determined by the cut-off-voltage of discharge and the cut-off-voltage of charge. For example, when the desired usage voltage range of the lithium ion secondary battery is 3.0 to 4.2 V (that is, the cut-off-voltage of discharge of 3.0 V, and the cut-off-voltage of charge of 4.2 V), the cell is charged and discharged under a range of 3.1 to 4.3 V (that is, the cut-off-voltage of discharge of 3.1 V, and the cut-off-voltage of charge of 4.3 V). From the discharge capacity at the second cycle thus obtained, the theoretical capacity (mAh/g) of the positive electrode active material per unit weight can be determined.

The theoretical capacity of the positive electrode is a product of (i) the active material weight included in the positive electrode, and (ii) the theoretical capacity of the positive electrode active material per unit weight. By determining the theoretical capacity of the negative electrode based on the obtained theoretical capacity of the positive electrode, a lithium ion secondary battery suitable for the desired cut-off-voltage of charge can be obtained.

The present invention further relates to a charge system for controlling the above-described lithium ion secondary battery to be within a predetermined voltage range. From the viewpoint of increasing the utilization rate of the positive electrode active material, the upper limit of the predetermined voltage range is set to not less than 4.3 V, for example, not less than 4.4 V, not less than 4.5 V or not less than 4.6 V.

The charge system of the present invention comprises, for example, the lithium ion secondary battery and a charger. The cut-off-voltage of charge of the charger is set to not less than 4.3 V, for example, not less than 4.4 V, not less than 4.5 V or not less than 4.6 V.

Figure 1:
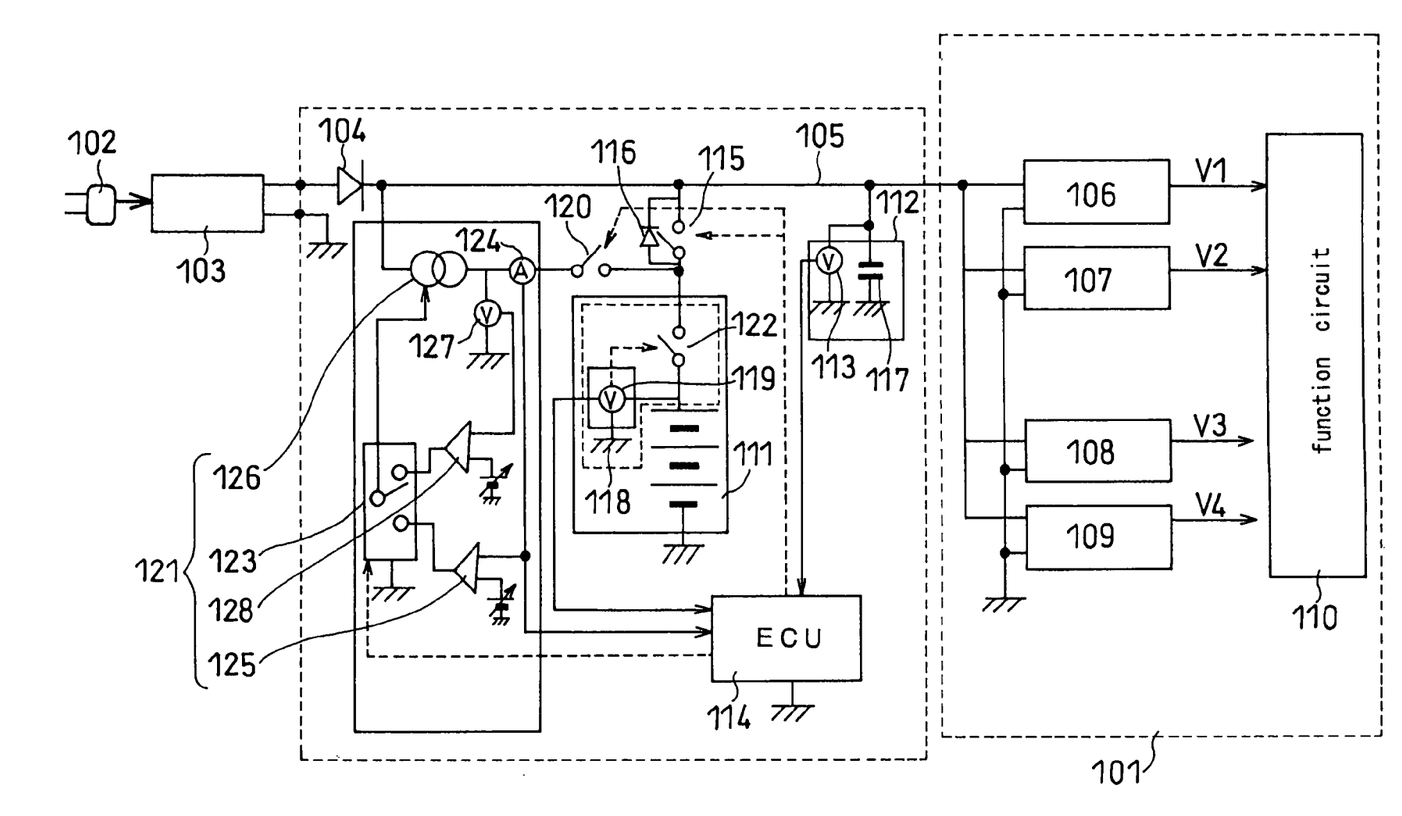
FIG. 1 is a schematic circuit diagram of a charge system of the present invention

FIG. 1 is a schematic circuit diagram of a charge system of the present invention. This circuit diagram shows a charge system connected to a load device 101 (e.g., a notebook computer).

When an electric plug 102 is connected to a commercial power supply (not shown in the diagram), an alternating current from the commercial power supply passes through an AC/DC converter 103 where the alternating current is converted to a direct current. The direct current passes through a diode 104 for preventing back flow due to reverse connection and is supplied to a power supply line 105. The power supply line 105 is connected to the load device 101. The power supplied from the power supply line 105 passes through voltage converters 106 to 109 to a function circuit 110 in the load device 101. The function circuit 110 drives devices such as a display device, a CPU, a driving device, etc. The voltage converters 106 to 109 each convert the power supplied from the power supply line 105 to a voltage that each device requires (indicated by V1 to V4 in the diagram).

When power is not supplied from a commercial power supply (e.g., when the electric plug 102 is not connected to the commercial power supply), power is supplied from a secondary battery 111. This switching is done by the action of a discharge switch 115 which is controlled by a logic circuit 112. An electron control unit (ECU) 114 reads the voltage level of a voltage-detecting device 113 in the logic circuit 112 and operates the discharge switch 115.

The charge system illustrated in FIG. 1 includes three lithium ion secondary batteries connected in series as the secondary battery 111. When the cut-off-voltage of charge of each lithium ion secondary battery is set to 4.3 V, for example, the voltage supplied from the three batteries would be 12.9 V at the maximum. Meanwhile, the AC-DC converter 103 supplies a voltage of 15 V. The ECU 114 determines whether the voltage level of the logic circuit 112 is 15 V or not greater than 12.9 V and determines whether or not power is supplied from the commercial power supply.

If the electric plug 102 is suddenly disconnected, the power supply from the commercial power supply stops. However, the discharge switch 115 comprising a MOSFET supplies a small amount of power from the secondary battery 111 through a parasitic diode 116 to the power supply line 105. The logic circuit 112 includes a capacitor 117 with a large capacity which also supplies a current to the power supply line 105. Accordingly, the voltage does not drop to 0 immediately after the power stop. If such voltage drop occurs, the ECU 114 soon turns on the discharge switch 115, allowing power from the secondary battery 111 to flow.

Conversely, if the electric plug 102 is connected to the commercial power supply, a voltage of 15 V is supplied so that the ECU 114 turns off the discharge switch 115, upon which a voltage detector 119 in a safety unit (SU) 118 detects the voltage level of the secondary battery 111, and turns on the charge switch 120 upon detection of a certain voltage level (e.g., 3.8 V or less). Thereby, a charger 121 starts charging. When the voltage detector 119 detects a voltage increase due to overcharge or a voltage decrease due to overdischarge, an SU switch 122 in the SU 118 is turned off.

Whenever the load device 101 is in sleep or turned off, the discharge switch 115 is off. When the load device 101 is started up, in other words, when the main power switch is turned on, the ECU 114 reads the voltage level of the logic circuit 112 to determine whether or not power is supplied from the commercial power supply, and turns on either the discharge switch 115 or the charge switch 120 according to the voltage level.

A detailed description is given below on the case where the charge switch 120 is turned on and the charger 121 starts charging.

When the capacity of the secondary battery 111 is low (e.g., when the secondary battery 111 has a voltage of 3.8 V or less) while the load device is connected to the commercial power supply, the ECU 114 turns on the charge switch 120 to allow the charger 121 to start charging. First, the ECU 114 sends a direction signal to a selector 123 to turn on a circuit comprising a current detector 124 and an error amplifier A 125, upon which a current control circuit 126 controls the current level to be constant. Thereby, constant current charge (CC) is performed.

When the voltage of the secondary battery 111 reaches a predetermined cut-off-voltage of charge (e.g., 4.3 V), the ECU 114 sends a direction signal to the selector 123 to turn off the circuit comprising the current detector 124 and the error amplifier A 125, and at the same time, turn on a circuit comprising a voltage detector 127 and another error amplifier V 128. At this time, the current control circuit 126 controls the voltage level to be constant at the same level as the cut-off-voltage of charge, namely, 4.3 V. Thereby, constant voltage charge (CV) is performed. Accordingly, the amount of current that flows through the current control circuit 126 decreases gradually. The ECU detects the current through a signal from the current detector 124. If the current decreases to a very low level of, for example, 1 mA, the ECU 114 turns off the charge switch 120 to terminate the charging.

As described above, in this embodiment, the cut-off-voltage of charge serves as a switching voltage between CC and CV and a reference voltage for constant voltage charge.

The charging method described above is also applicable to a case where a battery pack, such as a battery pack for power tools, detached from a load device (e.g., the body of a power tool) is charged by a charger designed specifically for the battery pack.

In the following, the present invention is described in detail based on Examples. However, the described content herein is merely an example of the present invention, and the present invention is not limited to these Examples.

EXAMPLE 1

(a) Fabrication of Positive Electrode

Lithium cobalt oxide in an amount of 3 kg, as a positive electrode active material, 1 kg of #1320 (product name)(NMP solution including 12 wt. % of PVDF) manufactured by Kureha Corporation as an positive electrode binder, 90 g of acetylene black as a conductive material, and an appropriate amount of NMP are stirred with a double-armed kneader, to prepare a positive electrode material mixture slurry. The slurry was applied on both sides of an aluminum foil with a 15 μm thickness as a positive electrode current collector, except for a positive electrode lead connection portion, and dried. The dried film was rolled with rollers to form a positive electrode material mixture layer. The thickness of the electrode plate comprising the aluminum foil and the positive electrode material mixture layers was controlled at this time to 160 μm. Afterwards, the electrode plate was cut to give a width that can be inserted in a battery can of a cylindrical battery (a diameter of 18 mm, and a length of 65 mm), thereby obtaining a positive electrode.

(b) Fabrication of Negative Electrode

An artificial graphite in an amount of 3 kg as a negative electrode active material, 75 g of BM-400B (product name) (an aqueous dispersion including 40 wt % of modified styrene butadiene copolymer) manufactured by Zeon Corporation as a negative electrode binder, 30 g of CMC as a thickener, and an appropriate amount of water were stirred with a double-armed kneader, to prepare a negative electrode material mixture slurry. The slurry was applied on both sides of a copper foil with a 10 μm thickness as a negative electrode current collector except for a negative electrode lead connecting portion, and dried. The dried film was rolled with rollers, to form a negative electrode material mixture layer. The thickness of the electrode plate comprising the copper foil and the negative electrode material mixture layers was set to 180 μm at this time. Afterwards, the electrode plate was cut to give a width that can be inserted in the above-mentioned battery can, thereby obtaining a negative electrode.

The cut-off-voltage of charge was set to 4.3 V, to control the theoretical capacity of the positive electrode and the negative electrode.

(c) Fabrication of Separator

On a microporous film (polyolefin layer) having a thickness of 10 μm and comprising polyethylene, an oxidation-resistant layer comprising an aramid resin was formed as in below.

To 100 parts by weight of NMP, 6.5 parts by weight of dried, anhydrous calcium chloride was added, and the mixture was heated in a reaction vessel to completely dissolve the calcium chloride. After this NMP solution containing calcium chloride was allowed to cool to room temperature, 3.2 parts by weight of paraphenylenediamine was added to the solution, and completely dissolved. Then, the reaction vessel was placed in a constant temperature room of 20° C., and 5.8 parts by weight of terephthalic acid dichloride was added dropwise to the NMP solution in an hour. Afterwards, the NMP solution was allowed to stand in a constant temperature room of 20° C. for an hour to advance polymerization reaction, thereby synthesizing polyparaphenylene terephthalamide (PPTA). After completion of the reaction, the NMP solution (polymerized liquid) was transferred from the constant temperature room to a vacuum room, and stirred under reduced pressure for 30 minutes to degas. The obtained polymerized liquid was diluted with an NMP solution containing calcium chloride, to obtain an NMP solution containing an aramid resin with a PPTA concentration of 1.4 wt %.

The obtained NMP solution containing the aramid resin was applied thinly on a microporous film comprising polyethylene (PE film) with a bar coater, and then dried with a hot blast of 80° C. (wind speed of 0.5 m/sec), to form an aramid resin film. The PE film carrying the aramid resin film was sufficiently washed with pure water, and dried. By washing with water, calcium chloride was removed from the aramid resin film, thereby forming a microporous film comprising an aramid resin (oxidation-resistant layer). The thickness of the oxidation-resistant layer was 10 μm, and the thickness of the separator including the PE film and the oxidation-resistant layer was 20 μm. The heat distortion temperature of the aramid resin was 321° C., and the porosity of the oxidation-resistant layer was 45%.

(d) Preparation of Non-Aqueous Electrolyte

In a non-aqueous solvent mixture including ethylene carbonate (EC) and ethylmethylcarbonate (EMC) in a volume ratio of 3:7, $LiPF_6$ was dissolved to give a concentration of 1 mol/L. To the obtained solution, 3 parts by weight of vinylene carbonate (VC) relative to 100 parts by weight of the solution was added, to obtain a non-aqueous electrolyte.

(e) Fabrication of Battery

A cylindrical battery was fabricated as in below.

To the lead connecting portions of the positive electrode and the negative electrode, one end of the positive electrode lead and one end of the negative electrode lead were connected, respectively. Afterwards, the positive electrode and the negative electrode were wound with the separator interposed therebetween, so that the oxidation-resistant layer of the separator faced the positive electrode, and the PE film faced the negative electrode, to form a cylindrical electrode assembly with its outermost perimeter covered with the separator.

The electrode assembly was sandwiched between an upper insulating ring and a lower insulating ring, and placed in a battery can. Then, 5 g of the above non-aqueous electrolyte was injected in the battery can. Afterwards, the electrode assembly was impregnated with the non-aqueous electrolyte. That is, the electrode assembly was allowed to stand under reduced pressure of 133 Pa, until there was no non-aqueous electrolyte remaining on the electrode assembly surface.

Afterwards, the other end of the positive electrode lead was welded to the underside of a battery lid, and the other end of the negative electrode lead was welded to an inner bottom face of the battery can. Lastly, the opening portion of the battery can was closed with the battery lid with an insulating packing disposed on its periphery, to complete a cylindrical lithium ion secondary battery.

EXAMPLE 2

A cylindrical lithium ion secondary battery was fabricated in the same manner as Example 1, except that the cut-off-voltage of charge was set to 4.4 V to control the theoretical capacities of the positive electrode and the negative electrode.

EXAMPLE 3

A cylindrical lithium ion secondary battery was fabricated in the same manner as Example 1, except that the cut-off-voltage of charge was set to 4.5 V to control the theoretical capacities of the positive electrode and the negative electrode.

EXAMPLES 4 TO 6

Cylindrical lithium ion secondary batteries of Examples 4 to 6 were fabricated in the same manner as Examples 1 to 3, respectively, except that an oxidation-resistant layer comprising a polyamideimide resin was formed on the PE film. The oxidation-resistant layer comprising the polyamideimide resin was formed as in below.

To 100 parts by weight of NMP, 2.1 parts by weight of trimellitic anhydride monochloride and 2.0 parts by weight of diamine (diaminodiphenylether ether) were added, and mixed at ambient temperature, to prepare an NMP solution containing a polyamide acid (polyamide acid concentration of 3.9 wt. %). The obtained NMP solution containing the polyamide acid was applied thinly on the PE film with a bar coater. Afterwards, the NMP was removed from the applied film by washing with water. Then, while the applied film was dried with a hot blast of 80° C. (wind speed of 0.5 m/sec), polyamide acid was dehydrated and cyclized (cyclodehydration). As a result, a microporous film comprising a polyamideimide resin (oxidation-resistant layer) with a thickness of 10 μm was formed on the PE film. The heat distortion temperature of the polyamideimide was 280° C., and the porosity of the oxidation-resistant layer was 46%.

EXAMPLES 7 TO 9

Cylindrical lithium ion secondary batteries of Examples 7 to 9 were fabricated in the same manner as Examples 1 to 3, respectively, except that an oxidation-resistant layer comprising a polyimide resin was formed on the PE film. The oxidation-resistant layer comprising the polyimide resin was formed as in below.

To 100 parts by weight of NMP, 2.1 parts by weight of pyromellitic dianhydride and 2.0 parts by weight of diamine (diaminodiphenylether ether) were added, and mixed at ambient temperature, to prepare an NMP solution containing a polyamide acid (polyamide acid concentration of 3.9 wt. %). The obtained NMP solution containing the polyamide acid was applied on a SUS substrate with a bar coater. Afterwards, the applied film was dried with a hot blast of 80° C. (wind speed of 0.5 m/sec). Then, the applied film was removed from the substrate, and drawn, to obtain a microporous film comprising a polyimide precursor.

The microporous film comprising the polyimide precursor was heated with a temperature of 300° C., to carry out dehydration imidization, thereby obtaining a microporous film comprising a polyimide resin and having a thickness of 10 μm. The microporous film comprising the polyimide resin (oxidation-resistant layer) and the PE film were stacked, and integrated by rolling with heat rollers of 80° C., thereby obtaining a separator with a thickness of 20 μm. The heat distortion temperature of the polyimide resin was 362° C., and the porosity of the oxidation-resistant layer was 50%.

EXAMPLE 10

A cylindrical lithium ion secondary battery was fabricated in the same manner as Example 2, except that an oxidation-resistant layer comprising a polyphenylene sulfide (PPS) resin was formed on the PE film. The oxidation-resistant layer comprising the polyphenylene sulfide resin was formed as in below.

To 100 parts by weight of 1-chloronaphthalene, 1.2 parts by weight of a short-fiber of drawn polyphenylene sulfide string "Torcon" (product name) manufactured by Toray Industries, Inc.) was dissolved at a temperature of 280° C. To the obtained solution, 2 parts by weight of alumina with a median size of 0.3 μm was added as an inorganic filler, and sufficiently stirred to obtain a slurry.

The obtained slurry was applied on a glass plate having a temperature of 210° C. with a bar coater, and dried in a drying furnace having a temperature of 250° C. for 3 hours, to obtain a brown film. The brown film was washed with N,N'-dimethyl formamide and then methanol, and further washed with pure water to obtain a microporous film. Afterwards, the microporous film comprising the polyphenylene sulfide resin (oxidation-resistant layer) and the PE film were stacked, and integrated by rolling with heat rollers of 80° C., to obtain a separator with a thickness of 20 μm. The heat distortion temperature of the polyphenylene sulfide resin was 135° C., and the porosity of the oxidation-resistant layer was 53%.

EXAMPLE 11

A cylindrical lithium ion secondary battery was fabricated in the same manner as Example 2, except that an oxidation-resistant layer comprising a polyetherimide resin was formed on the PE film. The oxidation-resistant layer comprising the polyetherimide resin was formed as in below.

To 100 parts by weight of NMP, 5 parts by weight of 4,4'[isopropylidenebis(p-phenyleneoxy)] diphthalic dianhydride, and 1 parts by weight of metaphenylenediamine were added, and mixed at ambient temperature, to obtain a solution.

The obtained NMP solution was applied thinly on the PE film with a bar coater, and after the solvent was removed by washing with water, the applied film was heated with a hot blast of 120° C. (wind speed of 0.5 m/sec) to dehydrate. As a result, a microporous film comprising a polyetherimide resin and having a thickness of 10 μm (oxidation-resistant layer) was formed on the PE film. The heat distortion temperature of the polyetherimide resin was 200° C., and the porosity of the oxidation-resistant layer was 47%.

EXAMPLE 12

A cylindrical lithium ion secondary battery was fabricated in the same manner as Example 2, except that an oxidation-resistant layer comprising a polyarylate resin was formed on the PE film. The oxidation-resistant layer comprising the polyarylate resin was formed as in below.

To 0.1 mol/L of an aqueous solution of sodium hydroxide, 2,2-bis(4-hydroxyphenyl)propane (bisphenol A) was dissolved, to obtain solution A having a bisphenol A concentration of 2.4 wt %. On the other hand, phthalic acid dichloride (tere/iso mixed in a weight ratio of 1:1) was dissolved in chloroform, to obtain solution B with a phthalic acid dichloride concentration of 2.3 wt %. Then, 100 parts by weight of solution A and 100 parts by weight of solution B were mixed, to allow the reaction of bisphenol A and phthalic acid dichloride at room temperature, to prepare a polyarylate solution.

The obtained polyarylate solution was applied thinly on the PE film with a bar coater. Then, the solvent was removed from the applied film by washing with toluene. Afterwards, the applied film was dried with a hot blast of 80° C. (wind speed of 0.5 m/sec). As a result, a microporous film comprising the polyarylate resin and having a thickness of 10 μm (oxidation-resistant layer) was formed on the PE film. The heat distortion temperature of the polyarylate resin was 164° C., and the porosity of the oxidation-resistant layer was 45%.

EXAMPLES 13 TO 16

Cylindrical lithium ion secondary batteries of Examples 13, 14, 15, and 16 were made in the same manner as Example 2, except that the thickness of the microporous film comprising an aramid resin was set to 0.5 μm, 5 μm, 15 μm, and 20 μm, and the thickness of the separator was set to 10.5 μm, 15 μm, 25 μm, and 30 μm.

EXAMPLE 17

A cylindrical lithium ion secondary battery was fabricated in the same manner as Example 2, except that the thickness of the microporous film comprising the aramid resin was set to 2 μm, the thickness of the PE film was set to 6 μm, and the thickness of the separator was set to 8 μm.

EXAMPLE 18

A cylindrical lithium ion secondary battery was fabricated in the same manner as Example 2, except that the thickness of the PE film was set to 20 μm, and the thickness of the separator was set to 30 μm.

EXAMPLES 19 TO 21

Cylindrical lithium ion secondary batteries were fabricated in the same manner as Examples 2, 5, and 8, respectively, except that $LiNi_{1/3}Mn_{1/3}Co_{1/3}O_2$ was used as the positive electrode active material for Examples 19, 20, and 21.

EXAMPLES 22 TO 24

Cylindrical lithium ion secondary batteries of Examples 22, 23, and 24 were fabricated in the same manner as Examples 2, 5, and 8, respectively, except that $LiNiO_2$ was used as the positive electrode active material.

EXAMPLES 25 TO 27

Cylindrical lithium ion secondary batteries of Examples 25, 26, and 27 were fabricated in the same manner as Examples 2, 5, and 8, respectively, except that the negative electrode fabricated as in below was used.

Powder of silicon simple substance in an amount of 3 kg as a negative electrode active material, 750 g of BM-400B (product name) manufactured by Zeon Corporation as a negative electrode binder, 300 g of CMC as a thickener, and an appropriate amount of water were mixed with a double-armed kneader, to prepare a negative electrode material mixture slurry. The slurry was applied on both sides of a copper foil having a thickness of 10 μm, i.e., a negative electrode current collector, except for a negative electrode lead connecting portion, and dried. The applied film after the drying was rolled with rollers, to form a negative electrode material mixture layer. The thickness of the electrode plate comprising the copper foil and the negative electrode material mixture layers was set to 180 μm. Afterwards, the electrode plate was cut into a width that can be inserted in the above-mentioned battery can, to obtain a negative electrode.

EXAMPLE 28

A cylindrical lithium ion secondary battery was fabricated in the same manner as Example 2, except that an oxidation-resistant layer including alumina as an inorganic filler was formed on the PE film. The oxidation-resistant layer was formed as in below.

To the NMP solution containing an aramid resin obtained in Example 1, 200 parts by weight of alumina fine particles (median size of 0.3 μm) per 100 parts by weight of the aramid resin was added and stirred. The obtained dispersion was thinly applied on the PE film with a bar coater, and dried with a hot blast of 80° C. (wind speed of 0.5 m/sec), to form an aramid resin film having a thickness of 10 μm and including a filler. Afterwards, the PE film carrying the aramid resin film was sufficiently washed with pure water, and dried, to remove calcium chloride from the aramid resin film. The obtained microporous film comprising the aramid resin (oxidation-resistant layer) had a thickness of 10 μm, and the thickness of the separator including the PE film and the oxidation-resistant layer was 20 μm. The heat distortion temperature of the aramid resin was 320° C., and the porosity of the oxidation-resistant layer was 56%.

COMPARATIVE EXAMPLE 1

A cylindrical lithium ion secondary battery was fabricated in the same manner as Example 1, except that a PE film with a thickness of 20 μm was used alone as a separator, and the cut-off-voltage of charge was set to 4.2 V to control the theoretical capacities of the positive electrode and the negative electrode.

COMPARATIVE EXAMPLE 2

A PE film with a thickness of 10 μm, and a microporous film (PP film) having a thickness of 10 μm and comprising polypropylene were stacked, and integrated by rolling with heat rollers of 120° C., to obtain a separator with a thickness of 20 μm. Using thus obtained separator, a cylindrical lithium ion secondary battery was fabricated in the same manner as Example 1, except that an electrode plate assembly was formed so that the PP film faced the positive electrode and the PE film faced the negative electrode, and the cut-off-voltage of charge was set to 4.2 V to control the theoretical capacities of the positive electrode and the negative electrode.

COMPARATIVE EXAMPLE 3 TO 5

Cylindrical lithium ion secondary batteries of Comparative Examples 3, 4, and 5 were made in the same manner as Comparative Example 2, except that the cut-off-voltage of charge was set to 4.3 V, 4.4 V, and 4.5 V to control the theoretical capacities of the positive electrode and the negative electrode.

COMPARATIVE EXAMPLE 6

A cylindrical lithium ion secondary battery was made in the same manner as Comparative Example 2, except that the same negative electrode used in Examples 25 to 27 was used, and the cut-off-voltage of charge was set to 4.4 V to control the theoretical capacities of the positive electrode and the negative electrode.

Formation of each battery is shown in Table 1. Additionally, the cut-off-voltage of charge of each battery is shown in Table 2. An IR spectrum of the oxidation-resistant layer of the separator used in each battery was obtained. It was confirmed that no absorption peak was found at around 2900 cm$^{-1}$ and around 1150 cm$^{-1}$.

TABLE 1

| | Battery | Positive Electrode Active Material | Negative Electrode Active Material | Positive Electrode Side Microporous Film Material | Thickness (μm) | Negative Electrode Side Microporous Film Material | Thickness (μm) |
|---|---|---|---|---|---|---|---|
| EX. | 1 | $LiCoO_2$ | Graphite | Aramid | 10 | PE | 10 |
| | 2 | | | Aramid | 10 | PE | 10 |
| | 3 | | | Aramid | 10 | PE | 10 |
| | 4 | | | Polyamideimide | 10 | PE | 10 |
| | 5 | | | Polyamideimide | 10 | PE | 10 |
| | 6 | | | Polyamideimide | 10 | PE | 10 |
| | 7 | | | Polyimide | 10 | PE | 10 |
| | 8 | | | Polyimide | 10 | PE | 10 |
| | 9 | | | Polyimide | 10 | PE | 10 |
| | 10 | | | PPS | 10 | PE | 10 |
| | 11 | | | Polyetherimide | 10 | PE | 10 |
| | 12 | | | Polyarylate | 10 | PE | 10 |
| | 13 | | | Aramid | 0.5 | PE | 10 |
| | 14 | | | Aramid | 5 | PE | 10 |
| | 15 | | | Aramid | 15 | PE | 10 |
| | 16 | | | Aramid | 20 | PE | 10 |
| | 17 | | | Aramid | 2 | PE | 6 |
| | 18 | | | Aramid | 10 | PE | 20 |
| | 19 | $LiNi_{1/3}Mn_{1/3}Co_{1/3}O_2$ | | Aramid | 10 | PE | 10 |
| | 20 | | | Polyamideimide | 10 | PE | 10 |
| | 21 | | | Polyimide | 10 | PE | 10 |
| | 22 | $LiNiO_2$ | | Aramid | 10 | PE | 10 |
| | 23 | | | Polyamideimide | 10 | PE | 10 |
| | 24 | | | Polyimide | 10 | PE | 10 |
| | 25 | $LiCoO_2$ | Si | Aramid | 10 | PE | 10 |
| | 26 | | | Polyamideimide | 10 | PE | 10 |
| | 27 | | | Polyimide | 10 | PE | 10 |
| | 28 | $LiCoO_2$ | Graphite | Aramid + Alumina | 10 | PE | 10 |
| Comp. Ex. | 1 | $LiCoO_2$ | Graphite | PE | 20 | — | — |
| | 2 | | | PP | 10 | PE | 10 |
| | 3 | | | PP | 10 | PE | 10 |
| | 4 | | | PP | 10 | PE | 10 |
| | 5 | | | PP | 10 | PE | 10 |
| | 6 | | Si | PP | 10 | PE | 10 |

TABLE 2

| | Battery | Cut-off voltage of charge (V) | 25° C. Capacity Retention Rate (%) | 45° C. Capacity Retention Rate (%) | Insulation Failure Rate (%) | High-Output Performance (%) |
|---|---|---|---|---|---|---|
| Ex. | 1 | 4.3 | 88 | 80 | 0 | 93 |
| | 2 | 4.4 | 84 | 80 | 2 | 92 |
| | 3 | 4.5 | 78 | 72 | 0 | 90 |
| | 4 | 4.3 | 86 | 79 | 0 | 89 |
| | 5 | 4.4 | 85 | 82 | 0 | 91 |
| | 6 | 4.5 | 80 | 75 | 0 | 90 |
| | 7 | 4.3 | 84 | 83 | 2 | 91 |
| | 8 | 4.4 | 84 | 77 | 0 | 91 |
| | 9 | 4.5 | 77 | 72 | 0 | 87 |
| | 10 | 4.4 | 80 | 76 | 2 | 95 |
| | 11 | 4.4 | 80 | 79 | 0 | 86 |
| | 12 | 4.4 | 83 | 74 | 0 | 85 |
| | 13 | 4.4 | 70 | 56 | 5 | 92 |
| | 14 | 4.4 | 81 | 72 | 0 | 90 |
| | 15 | 4.4 | 85 | 80 | 0 | 78 |
| | 16 | 4.4 | 82 | 74 | 0 | 72 |
| | 17 | 4.4 | 77 | 69 | 21 | 94 |
| | 18 | 4.4 | 79 | 74 | 0 | 68 |
| | 19 | 4.4 | 86 | 81 | 0 | 90 |
| | 20 | 4.4 | 84 | 77 | 1 | 88 |
| | 21 | 4.4 | 86 | 80 | 0 | 85 |
| | 22 | 4.4 | 80 | 73 | 3 | 90 |
| | 23 | 4.4 | 82 | 73 | 0 | 89 |
| | 24 | 4.4 | 79 | 75 | 0 | 91 |
| | 25 | 4.4 | 58 | 49 | 0 | 81 |
| | 26 | 4.4 | 60 | 51 | 4 | 80 |
| | 27 | 4.4 | 61 | 57 | 0 | 82 |
| | 28 | 4.4 | 86 | 82 | 0 | 96 |
| Comp. Ex. | 1 | 4.2 | 84 | 72 | 0 | 92 |
| | 2 | 4.2 | 86 | 83 | 2 | 93 |
| | 3 | 4.3 | 78 | 63 | 0 | 90 |
| | 4 | 4.4 | 58 | 40 | 0 | 79 |
| | 5 | 4.5 | 40 | 32 | 1 | 82 |
| | 6 | 4.4 | 26 | 10 | 4 | 80 |

The following evaluations were conducted for 50 batteries fabricated for each Example and each Comparative Example.
(Insulation Failure Rate)
Preliminary charge and discharge were carried out twice for each battery, and the battery was charged at a current of 400 mA until reaching 4.1 V. Afterwards, the charged battery was stored at a temperature of 45° C. for 7 days. Those batteries in which the open-circuit voltage declined 50 mV or more after the storage, compared with the open-circuit voltage before the storage, are determined as having insulation failure. The occurrence of insulation failure in the 50 batteries is shown in Table 2 as "insulation failure rate".
(High-Output Performance)
Charge and discharge were carried out at a temperature of 20° C. with the following conditions, to obtain a discharge capacity at high-output discharge.

Constant Current Charge: charged at a constant current, with an hour rate of 0.7 C (It), to the preset cut-off-voltage of charge Constant Voltage Charge: charged at the preset cut-off-voltage of charge until the cut-off-current of charge of 100 mA Constant Current Discharge: discharged at a constant current, with an hour rate of 0.2 C, until the cut-off-voltage of discharge of 2.5 V Constant Current Charge: charged at a constant current, with an hour rate of 1 C, to the preset cut-off-voltage of charge Constant Voltage Charge: charged at the preset cut-off-voltage of charge, until the cut-off-current of charge of 100 mA Constant Current Discharge: discharged at a constant current, with an hour rate of 2 C, until the cut-off-voltage of discharge of 2.5 V The hour rate X (C) implies that the theoretical capacity of the battery is discharged or charged in 1/X hour. The more the X value, the more the current value. The ratio of the discharge capacity at an hour rate of 2 C to the discharge capacity at an hour rate of 0.2 C is shown in Table 2 as "high-output performance".

(Cycle Life Performance)

A charge and discharge cycle of the battery was repeated 300 times (300 cycles) at temperatures of 25° C. and 450° C., with the following conditions. The ratio of the discharge capacity at 300th cycle relative to the initial discharge capacity is shown in Table 2 as "capacity retention rate".

Constant Current Charge: charged at a constant current, with hour rate of 0.7 C, to the preset cut-off-voltage of charge Constant Voltage Charge: charged at the preset cut-off-voltage of charge, until the cut-off-current of charge of 100 mA Constant Current Discharge: discharged at a constant current, with hour rate of 1 C, to the cut-off-voltage of discharge of 2.5 V Consideration In Comparative Example 1, with the separator comprising only the PE film, even with the cut-off-voltage of charge of 4.2 V, when charge and discharge cycle was repeated at 45° C., the capacity retention rate slightly declined. Therefore, the decline was probably caused because at high temperatures, oxidation of polyethylene advanced even at 4.2 V.

In Comparative Example 2, in which the PP film comprising polypropylene having a higher oxidation potential than polyethylene was allowed to face the positive electrode, when the cut-off-voltage of charge was 4.2 V, oxidation was retarded, and excellent cycle performance was exhibited. However, when the cut-off-voltage of charge was set to 4.3 V (Comparative Example 3), the capacity retention rate at high temperatures began to drop. Also, when the cut-off-voltage of charge was set to 4.4 V (Comparative Example 4) or 4.5 V (Comparative Example 5), the reduction in capacity retention rate became notable even at room temperature.

On the other hand, in those batteries using the separator including the PE film and the oxidation-resistant layer, which is allowed to face the positive electrode, even when the cut-off-voltage of charge was made higher to 4.5 V, the capacity retention rate at high temperatures was excellent. However, in Example 13, with a thin oxidation-resistant layer thickness of 0.5 µm, there was a slight decline in the capacity retention rate. Therefore, the thickness of the oxidation-resistant layer is preferably 1 µm or more. In Example 16, with a thick oxidation-resistant layer of 20 µm, there was a decline in high-output performance. This is probably because the thick oxidation-resistant layer increased the resistance. In view of the above, the thickness of the oxidation-resistant layer is preferably 1 to 16 µm.

In Example 17, in which the total thickness of the oxidation-resistant layer and the PE film was 8 µm, the insulation failure rate was high. This is probably because the thin separator easily caused the internal short circuits. On the other hand, in Example 18, with the thick separator as in Example 16, the internal resistance became high, and high-output performance declined. In view of the above, the thickness of the separator is preferably 10 to 25 µm.

The effects of improvement in cycle life performance due to the presence of the oxidation-resistant layer were confirmed when the positive electrode active material was $LiNi_{1/3}Mn_{1/3}Co_{1/3}O_2$ and $LiNiO_2$ as well, in addition to the case when the positive electrode active material was $LiCoO_2$. Also, not only the case when graphite was used as the negative electrode active material, but also the case when the material which expands and contracts to a large extent while charging and discharging (simple substance of silicon) was used, the effects of improvement in cycle life performance were obtained.

In Examples 10 and 28, in which an inorganic filler was added to the oxidation-resistant layer, there was an improvement in high-output performance. This is probably because the addition of the inorganic filler optimized the porous structure in the oxidation-resistant layer, and improved ion conductivity.

A lithium ion secondary battery of the present invention enables excellent cycle performance even when the cut-off-voltage of charge was set higher, and achieves a high capacity. Therefore, a lithium ion secondary battery of the present invention is suitable for power sources for various devices, for example, power sources for personal digital assistants, mobile electronic devices, household small electric power storage devices, motorcycles, electric vehicles, and hybrid electric vehicles. However, the application is not limited. The present invention can be applied to various lithium ion secondary batteries, but particularly useful for lithium ion secondary batteries including lithium-containing composite oxide mainly composed of nickel or cobalt as the positive electrode active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising:
a positive electrode;
a negative electrode;
a non-aqueous electrolyte; and
a separator interposed between said positive electrode and said negative electrode;
wherein said separator comprises a polyolefin layer and an oxidation-resistant layer,
said oxidation-resistant layer comprises an oxidation-resistant polymer and an inorganic filler,
said oxidation-resistant polymer includes at least one selected from the group consisting of polyimide, aramid, and a polyamideimide, a main chain of said oxidation-resistant polymer includes neither a —$CH_2$— group nor a —$CH(CH_3)$— group, said oxidation-resistant layer faces said positive electrode,
said polyolefin layer faces said negative electrode,
the thickness of said oxidation-resistant layer is 2 to 10 μm,
the total thickness of said oxidation-resistant layer and said polyolefin layer is 10 to 25 μm,
a cut-off-voltage of charge is set to 4.4 V or more,
the negative electrode includes a negative electrode active material, and
the negative electrode active material is a material including Si.

2. The lithium ion secondary battery in accordance with claim 1, wherein said polyolefin layer comprises polyethylene.

3. The lithium ion secondary battery in accordance with claim 1, wherein the content of said inorganic filler is not less than 25 wt % and less than 80 wt % relative to the weight of said oxidation-resistant layer.

4. The lithium ion secondary battery in accordance with claim 1, wherein
the negative electrode includes a negative electrode active material, and
the negative electrode active material is at least one selected from the group consisting of Si, a Si alloy and $SiO_x$ (0<x<2).

5. A lithium ion secondary battery comprising:
a positive electrode;
a negative electrode;
a non-aqueous electrolyte; and
a separator interposed between said positive electrode and said negative electrode;
wherein said separator comprises a polyolefin layer and an oxidation-resistant layer,
said oxidation-resistant layer comprises an oxidation-resistant polymer and an inorganic filler,
said oxidation-resistant polymer includes at least one selected from the group consisting of polyimide, aramid, and a polyamideimide, in an IR spectrum for said oxidation-resistant polymer, each height of absorption peaks attributable to C—H stretching vibration of a —$CH_2$-group and attributable to C—C stretching vibration of a —$CH(CH_3)$— group is 0% to 7% of the maximum value of heights of absorption peaks in a range of 500 to 3500 $cm^{-1}$,
said oxidation-resistant layer faces said positive electrode,
said polyolefin layer faces said negative electrode,
the thickness of said oxidation-resistant layer is 2 to 10 μm,
the total thickness of said oxidation-resistant layer and said polyolefin layer is 10 to 25 μm,
a cut-off-voltage of charge is set to 4.4 V or more,
the negative electrode includes a negative electrode active material, and
the negative electrode active material is a material including Si.

6. The lithium ion secondary battery in accordance with claim 5, wherein the content of said inorganic filler is not less than 25 wt % and less than 80 wt % relative to the weight of said oxidation-resistant layer.

7. The lithium ion secondary battery in accordance with claim 5, wherein
the negative electrode includes a negative electrode active material, and
the negative electrode active material is at least one selected from the group consisting of Si, a Si alloy and $SiO_x$ (0<x<2).

8. A lithium ion secondary battery comprising:
a positive electrode;
a negative electrode;
a non-aqueous electrolyte; and
a separator interposed between said positive electrode and said negative electrode;
wherein said separator comprises a polyolefin layer and an oxidation-resistant layer,
said oxidation-resistant layer comprises an oxidation-resistant polymer including aramid, and an inorganic filler,
said oxidation-resistant layer faces said positive electrode,
said polyolefin layer faces said negative electrode,
the thickness of said oxidation-resistant layer is 2 to 10 μm,
the total thickness of said oxidation-resistant layer and said polyolefin layer is 10 to 25 μm,
a cut-off-voltage of charge is set to 4.4 V or more,
the negative electrode includes a negative electrode active material, and
the negative electrode active material is a material including Si.

9. The lithium ion secondary battery in accordance with claim 8, wherein the content of said inorganic filler is not less than 25 wt % and less than 80 wt % relative to the weight of said oxidation-resistant layer.

10. The lithium ion secondary battery in accordance with claim 8, wherein
the negative electrode includes a negative electrode active material, and
the negative electrode active material is at least one selected from the group consisting of Si, a Si alloy and $SiO_x$ (0<x<2).

11. A charge system for a lithium ion secondary battery comprising: the lithium ion secondary battery in accordance with claim 1; and a charger for said secondary battery.

12. A charge system for a lithium ion secondary battery comprising: the lithium ion secondary battery in accordance with claim 5; and a charger for said secondary battery.

13. A charge system for a lithium ion secondary battery comprising: the lithium ion secondary battery in accordance with claim 8; and a charger for said secondary battery.

* * * * *